US011233703B2

(12) United States Patent
Vejman et al.

(10) Patent No.: US 11,233,703 B2
(45) Date of Patent: Jan. 25, 2022

(54) EXTENDING ENCRYPTED TRAFFIC ANALYTICS WITH TRAFFIC FLOW DATA

(71) Applicant: Cisco Technology, Inc., San Jose, CA (US)

(72) Inventors: Martin Vejman, Litomysl (CZ); Lukas Machlica, Prague (CZ)

(73) Assignee: CISCO TECHNOLOGY, INC., San Jose, CA (US)

( * ) Notice: Subject to any disclaimer, the term of this patent is extended or adjusted under 35 U.S.C. 154(b) by 171 days.

(21) Appl. No.: 16/196,543

(22) Filed: Nov. 20, 2018

(65) Prior Publication Data

US 2020/0162339 A1 May 21, 2020

(51) Int. Cl.
*H04L 12/24* (2006.01)
*H04L 12/26* (2006.01)
*H04L 29/06* (2006.01)

(52) U.S. Cl.
CPC .......... *H04L 41/142* (2013.01); *H04L 41/145* (2013.01); *H04L 41/22* (2013.01);
(Continued)

(58) Field of Classification Search
CPC ..... H04L 41/142; H04L 41/145; H04L 41/22; H04L 43/026; H04L 43/04;
(Continued)

(56) References Cited

U.S. PATENT DOCUMENTS 8,539,221 B2  9/2013 Tremblay et al.
9,288,220 B2  3/2016 Raugas et al.
(Continued)

FOREIGN PATENT DOCUMENTS

EP  3382960 A2  10/2018

OTHER PUBLICATIONS

International Search Report and Written Opinion in counterpart International Application No. PCT/US2019/040929, dated Sep. 18, 2019, 15 pages.
(Continued)

*Primary Examiner* — Daniel B Potratz
*Assistant Examiner* — Wansik You
(74) *Attorney, Agent, or Firm* — Edell, Shapiro & Finnan, LLC

(57) ABSTRACT

Techniques for enriching encrypted traffic analytics are presented. In one embodiment, a method includes obtaining telemetry data for one or more domains within a network. The telemetry data includes both encrypted traffic analytics information and traffic flow information associated with the network traffic. For each domain of the one or more domains, the method also includes generating a model comprising a mapping from a plurality of traffic flow information features to at least one encrypted traffic analytics feature. The method includes generating a database comprising generated models for each of the domains and obtaining telemetry data for a target domain that includes traffic flow information, but does not include encrypted traffic analytics information. At least one encrypted traffic analytics feature of the target domain is determined based on a plurality of traffic flow information features of the target domain using the database.

20 Claims, 5 Drawing Sheets

(52) U.S. Cl.
CPC ............ *H04L 43/026* (2013.01); *H04L 43/04* (2013.01); *H04L 63/1425* (2013.01); *H04L 63/166* (2013.01)

(58) Field of Classification Search
CPC ............... H04L 63/1425; H04L 63/166; H04L 47/2441; H04L 63/168; H04L 63/0428
See application file for complete search history.

(56) References Cited

U.S. PATENT DOCUMENTS

| | | |
|---|---|---|
| 9,491,078 B2 | 11/2016 | Christodorescu et al. |
| 2010/0107257 A1* | 4/2010 | Ollmann .................. G06F 21/56 726/24 |
| 2017/0201810 A1 | 7/2017 | Anderson et al. |
| 2017/0374016 A1* | 12/2017 | Reddy .................... H04L 67/322 |
| 2018/0062950 A1* | 3/2018 | Baldi ...................... H04L 67/02 |
| 2018/0103056 A1* | 4/2018 | Kohout ............... H04L 63/0428 |
| 2018/0109542 A1* | 4/2018 | Katzir .................... G06N 20/00 |

OTHER PUBLICATIONS

Cisco, "Encrypted Traffic Analytics", Jan. 2018, 10 pages.
Cisco, "Encrypted Traffic Analytics in Software-Defined Access Deployment Guide", Cisco Validated Design, Jul. 2018, 60 pages.
Office Action in counterpart European Application No. 19746233.6, dated Aug. 10, 2021, 11 pages.

* cited by examiner

EXTENDING ENCRYPTED TRAFFIC ANALYTICS WITH TRAFFIC FLOW DATA

TECHNICAL FIELD

The present disclosure relates to analyzing encrypted traffic in a network.

BACKGROUND

Encrypted Traffic Analytics (ETA) provides a source of additional information related to network traffic in a network. From the ETA information, valuable information about the network and devices in the network may be extracted. However, ETA is often deployed in networks only partially or not at all, as some networks may not have sufficiently capable hardware available to extract ETA telemetry data for use in the network. As a result, the full benefits of ETA are not being fully exploited in many networks.

DESCRIPTION OF EXAMPLE EMBODIMENTS

Overview

Presented herein are techniques for enriching encrypted traffic analytics by determining encrypted traffic analytics features from traffic flow information features. In one embodiment, a method is provided that includes obtaining telemetry data for one or more domains within a network. The telemetry data for the one or more domains includes both encrypted traffic analytics information associated with network traffic in the network and traffic flow information associated with the network traffic. For each domain of the one or more domains, the method also includes generating a model comprising a mapping from a plurality of traffic flow information features to at least one encrypted traffic analytics feature. The method further includes generating a database comprising generated models for each of the one or more domains and obtaining telemetry data for a target domain that includes traffic flow information, but does not include encrypted traffic analytics information. At least one encrypted traffic analytics feature of the target domain is determined based on a plurality of traffic flow information features of the target domain using the database.

Example Embodiments

The principles of the example embodiments described herein provide techniques for extending or enriching knowledge associated with traffic flow information for network traffic about a domain that lacks encrypted traffic analytics information to increase/improve the efficacy of a detection system for network traffic.

According to the example embodiments, because traffic flow information features about a domain are not sufficiently descriptive on their own, a set of models are constructed to form a database that maps traffic flow information features to encrypted traffic analytics features. Using the database, traffic flow information features for a domain that lacks encrypted traffic analytics information may be extended or enriched according to the mappings between the features from the database.

For example, in the case where a domain hosts two different services, such as a content delivery network and an email client, based on traffic flow information features on their own (e.g., port number, transferred bytes, etc.) an inference can be made that the domain is associated with two different services. However, the identity or nature of the exact types of services hosted by the domain can be identified only using encrypted traffic analytics features. The principles of the example embodiments described herein provide a technique to allow encrypted traffic analytics features to be linked or mapped to traffic flow information features using a database that includes models generated from other domains where both encrypted traffic analytics information and traffic flow information are available. With these techniques, encrypted traffic analytics features may be determined for a domain based only on traffic flow information features for the domain.

Figure 1:
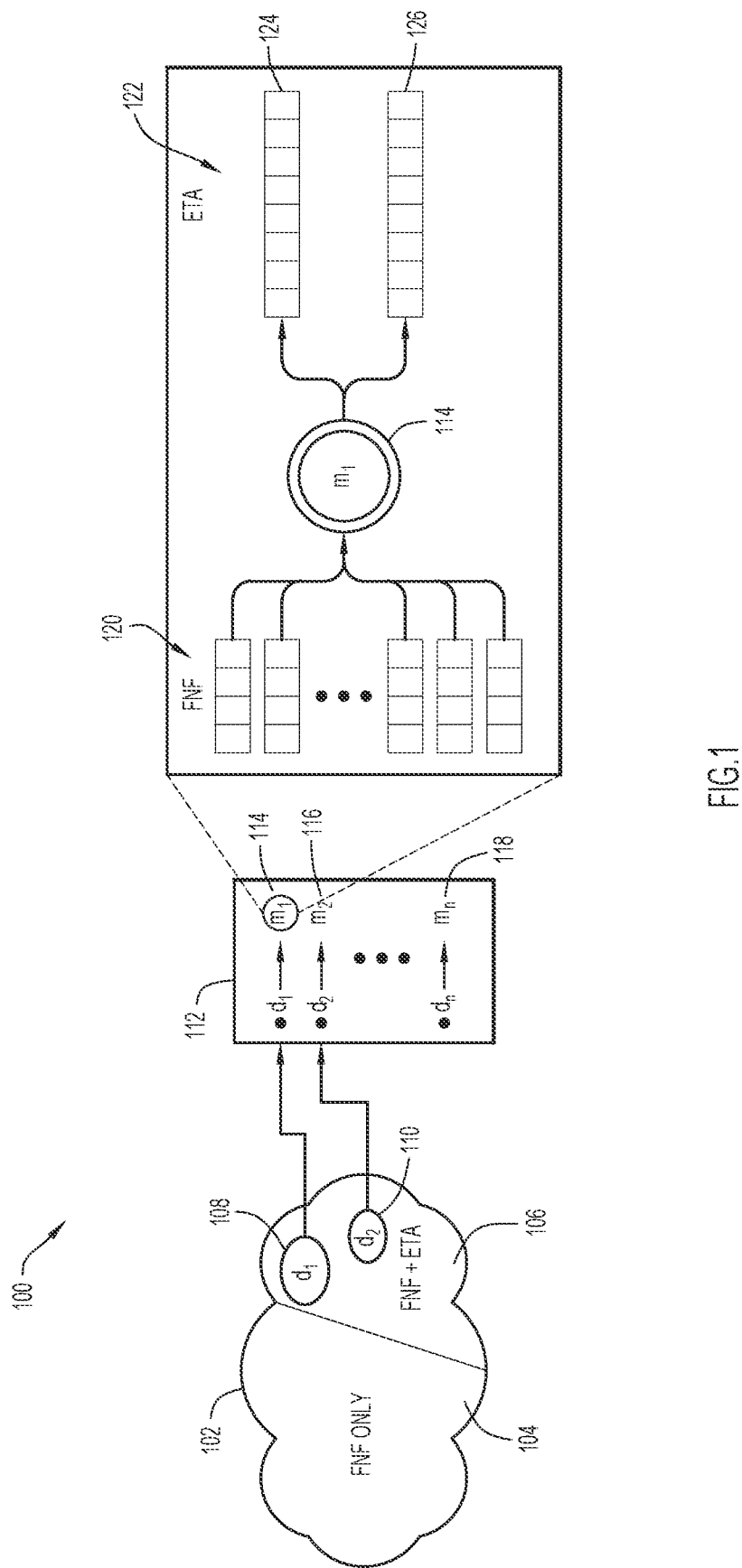
FIG. 1 is a diagram of a network in which techniques for extending Encrypted Traffic Analytics (ETA) with traffic flow information may be implemented, according to an example embodiment.

With reference to FIG. 1, an example of network 100 in which techniques for extending or enriching knowledge associated with traffic flow information for network traffic about a domain that lacks encrypted traffic analytics information may be implemented is shown. Network 100 includes a plurality of network devices that may communicate with one or more domains of a plurality of domains to generate telemetry data 102. Telemetry data 102 may include traffic flow information and/or encrypted traffic analytics information associated with one or more domains of the plurality of domains in network 100.

In this embodiment, telemetry data 102 includes a first portion 104 that contains only traffic flow information and associated traffic flow information features for one or more domains of the plurality of domains in network 100. Telemetry data 102 also includes a second portion 106 that contains a combination of both traffic flow information and encrypted traffic analytics information.

As used herein and in the claims, traffic flow information and features may include one or more of a port number (e.g., source port and/or destination port), transferred bytes/packets (e.g., sent and/or received), Internet Protocol (IP) addresses (e.g., source IP address, destination IP address), elapsed time, periodicity, flow rate, protocol, collector interface, and Transmission Control Protocol (TCP) flags. In some embodiments, traffic flow information and features may include information obtained from Cisco's Flexible NetFlow (FNF) technology. Additionally, as used herein and in the claims, encrypted traffic analytics information and features may include one or more of a sequence of packet lengths and times (SPLT) (e.g., array of packets up and/or down with timestamps), byte distribution, initial data packet (IDP) (e.g., transport layer security (TLS) version, offered cipher suites, selected cipher suite, client random, server random, client TLS extensions, server TLS extensions, Server Name Indication (SNI), session identifier), and other TLS data. In some embodiments, encrypted traffic analytics information and features may include information obtained from Cisco's Encrypted Traffic Analytics (ETA) technology.

As shown in FIG. 1, a domain for which only first portion 104 of telemetry data 102 (i.e., that contains only traffic flow information and associated traffic flow information features) is available will not be able to differentiate between various communication types to allow identification of different services on the domain. According to the principles of the example embodiments, a set of models are constructed to form a database that maps traffic flow information features to encrypted traffic analytics features so that probable encrypted traffic analytics features may be obtained from the traffic flow information features of a domain.

To generate such a database, the techniques presented herein begin with a learning phase that is used to generate models for the database. During this learning phase, a mapping from traffic flow information features (i.e., input) to encrypted traffic analytics features (i.e., output) is learned on traffic that includes both traffic flow information and encrypted traffic analytics information. For example, as shown in FIG. 1, second portion 106 of telemetry data 102 includes both traffic flow information and encrypted traffic analytics information for one or more domains of the plurality of domains, including a first domain 108 (d1) and a second domain 110 (d2), is used to generate the models for a database 112. In an example embodiment, database 112 may be in the form of a lookup table. In other embodiments, database 112 may be in the form of another type of data structure that is used to store the set of models.

For each domain that has both traffic flow information and encrypted traffic analytics information available (e.g., first domain 108 and second domain 110 shown in FIG. 1), a model is generated that maps a plurality of traffic flow information features to at least one encrypted traffic analytics feature. For example, database 112 includes a set of models for a plurality of domains, including a first model 114 based on the mappings generated for first domain 108 and a second model 116 based on the mappings generated for second domain 110. In this embodiment, database 112 includes at least two models, one for each of first domain 108 and second domain 110. In other embodiments, database 112 may include a set of models for any number of domains up to n number of domains (i.e., an nth model 118 generated for an nth domain, where n is any number greater than two).

Next, as shown in FIG. 1, first model 114 for first domain 108 illustrates an example of a mapping between traffic flow information features and encrypted traffic analytics features obtained or generated based on second portion 106 of telemetry data 102. In this embodiment, first model 114 includes a plurality of traffic flow information features 120 obtained based on the traffic flow information of second portion 106 of telemetry data 102 that is associated with first domain 108. First model 114 also includes a plurality of encrypted traffic analytics features 122 obtained based on the encrypted traffic analytics information of second portion 106 of telemetry data 102 that is associated with first domain 108. Accordingly, first model 114 for first domain 108 maps plurality of traffic flow information features 120 to plurality of encrypted traffic analytics features 122.

In this embodiment, the plurality of encrypted traffic analytics features 122 includes at least a first encrypted traffic analytics feature 124 and a second encrypted traffic analytics feature 126. For example, first encrypted traffic analytics feature 124 may be a server name identifier TLS extension and second encrypted traffic analytics feature 126 may be a particular cipher suite used by the domain.

In the example embodiments, a model is learned or generated for each domain of the plurality of domains separately because the traffic flow information features are too simple to differentiate between all possible communication types across all of the domains. By generating each domain's model separately, the mapping between traffic flow information features and encrypted traffic analytics features may be learned for a single domain at a time. Together, the set of models for all of the plurality of domains is then combined and used to generate database 112.

Additionally, in some embodiments, a database may be generated for each customer or client individually.

Figure 2:
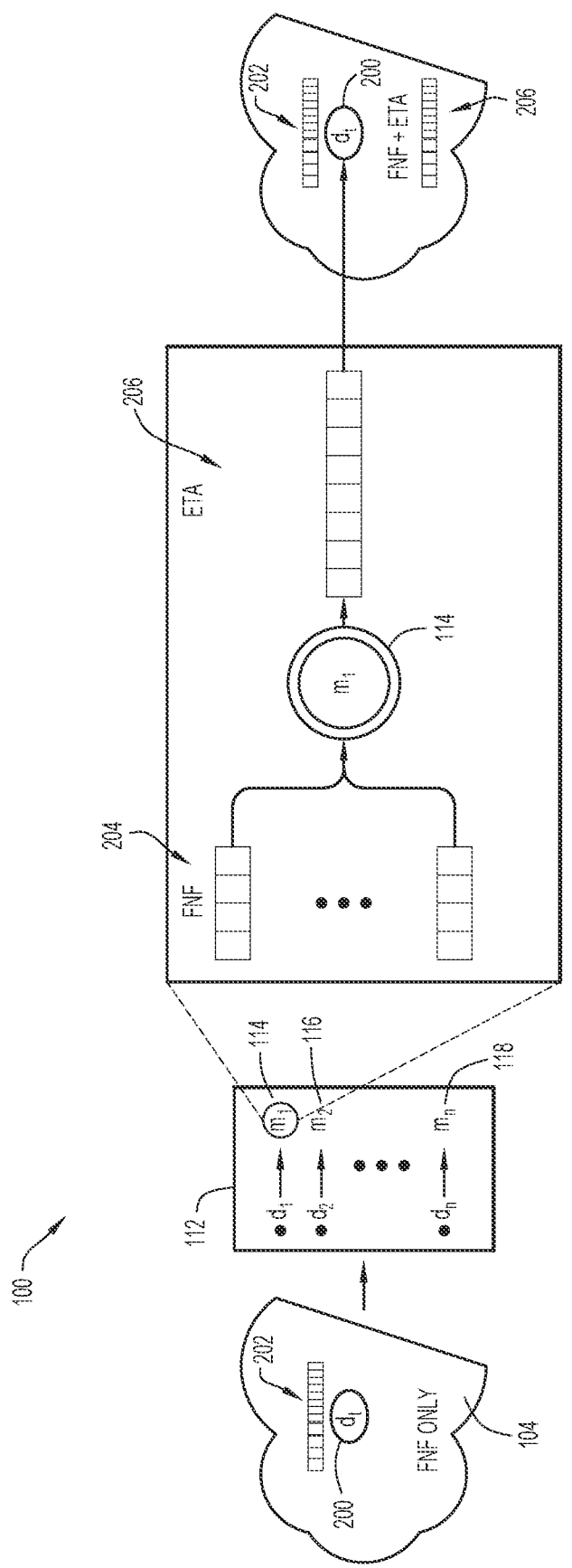
FIG. 2 is a diagram of a process for determining an encrypted traffic analytics feature for a domain from traffic flow information features, according to an example embodiment.

Referring now to FIG. 2, a diagram of a process for determining an encrypted traffic analytics feature for a target domain from traffic flow information features is shown according to an example embodiment. In this embodiment, an inference phase using database 112 may be used to determine at least one encrypted traffic analytics feature for a target domain based on a plurality of traffic flow information features.

As shown in FIG. 2, a target domain 200 (dt) is associated with first portion 104 of telemetry data 102 that includes only traffic flow information 202 for target domain 200. That is, telemetry data 102 does not include any encrypted traffic analytics information for target domain 200. The techniques of the present embodiments described herein may be used to enrich or extend traffic flow information 202 for target domain 200 with at least one encrypted traffic analytics feature that is determined using database 112.

In this embodiment, a model from the set of models 114, 116, 118 in database 112 is selected for target domain 200. For example, the selected model may be chosen based on similarities in traffic flow information and features between the selected model and target domain 200. In this embodiment, first model 114 is selected from database 112 as the model for target domain 200.

Next, a plurality of traffic flow information features 204 are obtained or collected for target domain 200 from the observed telemetry data 102. For example, plurality of traffic flow information features 204 for target domain 200 may be obtained from traffic flow information 202 for target domain 200 contained in first portion 104 of telemetry data 102. The plurality of traffic flow information features 204 are used as an input to first model 114. Based on the mapping between the traffic flow information features and encrypted traffic analytics features from first model 114, at least one encrypted traffic analytics feature 206 is generated for target domain 200.

In some embodiments, one or more encrypted traffic analytics feature may be generated for a domain using database 112. For example, while at least one encrypted traffic analytics feature 206 is shown in FIG. 2, other encrypted traffic analytics features may also be output from first model 114 based on the input of plurality of traffic flow information features 204 for target domain 200. In other embodiments, a most probable encrypted traffic analytics feature may be generated for a domain using database 112. For example, encrypted traffic analytics feature 206 for target domain 200 may be output from first model 114 as being the most probable encrypted traffic analytics feature for target domain 200 based on the input of plurality of traffic flow information features 204.

The plurality of traffic flow information 202 for target domain 200 may then be enriched or extended with at least one encrypted traffic analytics feature 206 generated using database 112. With this arrangement, the available knowledge about target domain 200 is enriched with this additional information. That is, previously only traffic flow information and features were available for target domain 200 based on telemetry data 102. The techniques of the example embodiments allow this traffic flow information and features to be enriched or extended with additional encrypted traffic analytics features determined using models 114, 116, 118 from other domains in database 112.

Figure 3:
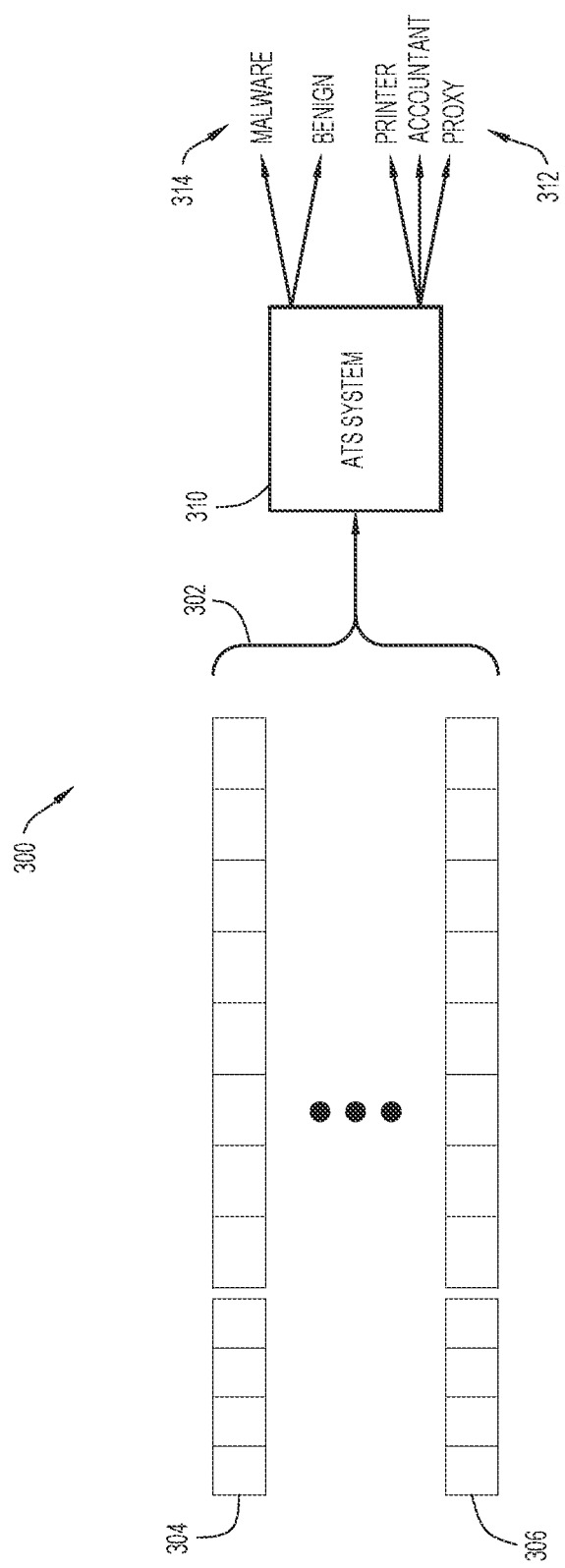
FIG. 3 is a diagram of a process for using determined encrypted traffic analytics features based on traffic flow information to obtain identity information about a domain, according to an example embodiment.

FIG. 3 is a diagram of a process for using determined encrypted traffic analytics features based on traffic flow information to obtain identity information about a domain, according to an example embodiment. In an example embodiment, a process 300 for obtaining identify information about a domain is illustrated based on enriched/extended knowledge about the domain generated using the techniques of the present embodiments. In some embodiments, process 300 may be implemented by a network controller (e.g., controller 500 illustrated in FIG. 5 below) or other network device with access to telemetry data 102 for network 100.

In this embodiment, process 300 may be applied to a target domain for which only traffic flow information and features are available from observed telemetry data (e.g., only first portion 104 of telemetry data 102 is available for the target domain). Based on the available traffic flow information features (e.g., transferred bytes/packets up and down, elapsed time, periodicity, flow rate, etc.) for the target domain, two different behaviors are observed for the traffic to/from the target domain.

The identity or description of the services associated with the target domain responsible for such different behaviors is not able to be determined based only on the traffic flow information features. However, using enriched or extended knowledge about the target domain based on determined encrypted traffic analytics features generated according to the example embodiments described herein allows inspection of relevant metadata for the services, thereby, permitting an identification of the services operating on the target domain.

In an example scenario, the target domain hosts multiple services that have different behaviors (e.g., an email service, a file sharing service, a shopping service, etc.). In this embodiment, process 300 includes determining encrypted traffic analytics features 302 from traffic flow information features about the target domain using a model from database 112. For example, using traffic flow information features associated with one of the identified behaviors for the target domain as an input to a model from the set of models in database 112, a first encrypted traffic analytics feature 304 may be generated. Similarly, using traffic flow information features associated with another of the identified behaviors for the target domain as an input to database 112, a second encrypted traffic analytics feature 306 may also be generated. In this example, the model from database 112 generates a most probable encrypted traffic analytics feature for each group of traffic flow information features associated with the different behaviors observed within the target domain.

In some embodiments, a security monitoring system 310 may use the enriched/extended knowledge of the target domain (i.e., the observed traffic flow information/features and generated encrypted traffic analytics features) to identify services and/or devices generating telemetry data to/from the target domain (e.g., a plurality of services/devices 312) and make determinations regarding potential threats in the target domain (e.g., threat assessments 314). In some embodiments, security monitoring system 310 may be an Advanced Threat Solutions (ATS) System.

As an example, first encrypted traffic analytics feature 304 may include a field such as a server name identifier TLS extension from which communication to/from the target domain may be identified as being related to a shopping website or service. In this case, using the enriched/extended knowledge about the target domain from the generated encrypted traffic analytics feature (e.g., first encrypted traffic analytics feature 304), an identification of one of the different services hosted by the target domain can be made. Additionally, using first encrypted traffic analytics feature 304, security monitoring system 310 may determine that the identified service on the target domain is benign.

As another example, a different service on the target domain may be associated with large packet counts obtained based on the traffic flow information (e.g., observed from first portion 104 of telemetry data 102). By extending/enriching knowledge of the service on the target domain with the generated second encrypted traffic analytics feature 306, which may be, for example, a particular cipher suite used by the service, a determination can be made that this service on the target domain is not a legitimate file sharing/syncing service. Instead, information about the service from second encrypted traffic analytics feature 306 allows this other service to be identified as data exfiltration malware. For example, security monitoring system 310 may use second encrypted traffic analytics feature 306 to determine that the identified service on the target domain is malware.

Figure 4:
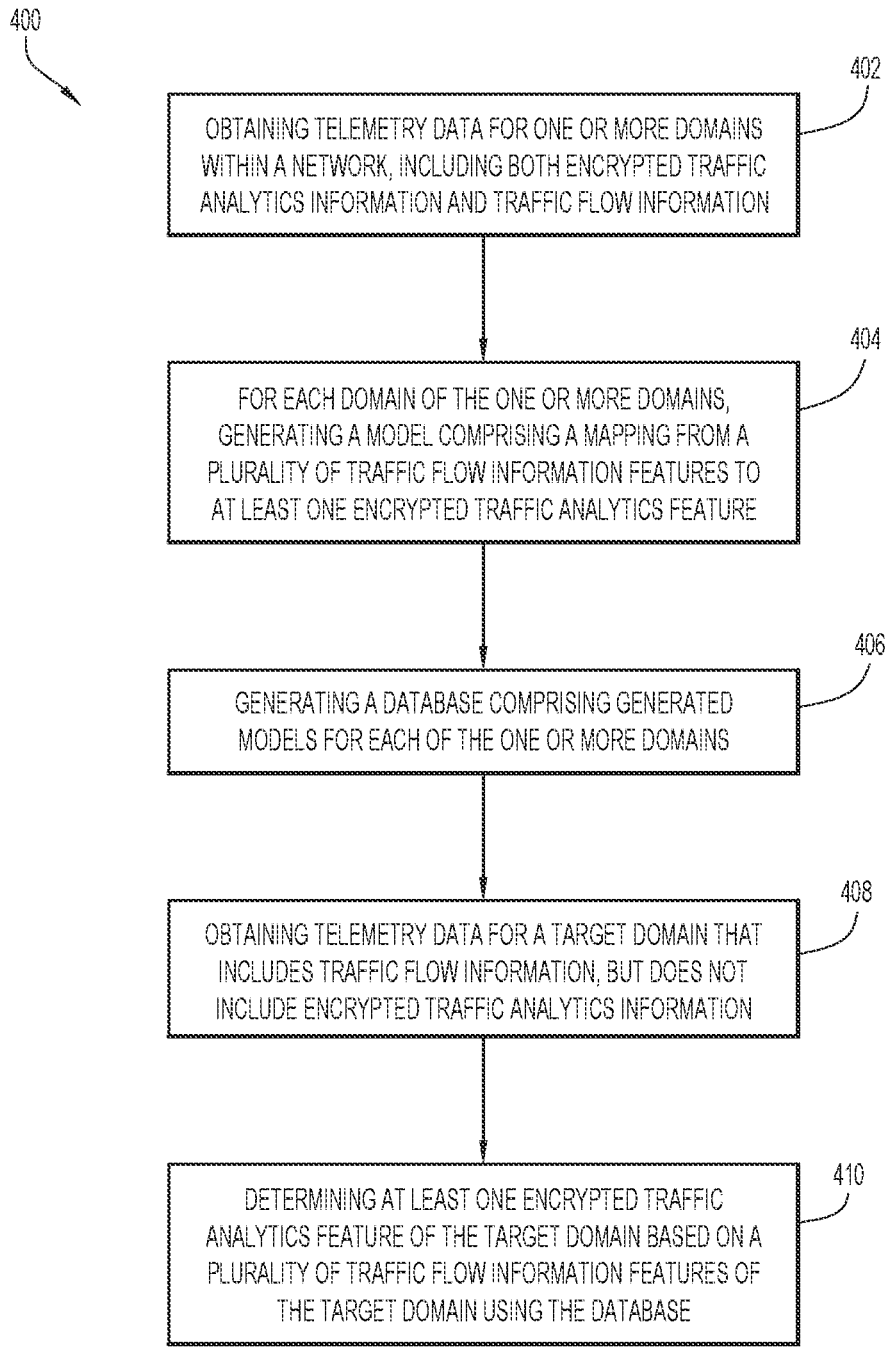
FIG. 4 is a flowchart of a method for determining an encrypted traffic analytics feature for a domain from traffic flow information features, according to an example embodiment.

FIG. 4 is a flowchart of a method 400 for determining an encrypted traffic analytics feature for a domain from traffic flow information features, according to an example embodiment. In some embodiments, method 400 may be implemented by a network controller (e.g., controller 500 illustrated in FIG. 5 below) or other network device with access to telemetry data 102 for network 100. Method 400 may begin at an operation 402 where telemetry data for one or more domains within a network is obtained. The telemetry data includes both encrypted traffic analytics information and traffic flow information. For example, as shown in FIG. 1, operation 402 may include obtaining telemetry data 102 for at least first domain 108 and second domain 110, where the obtained telemetry data 102 includes second portion 106 having both encrypted traffic analytics information and traffic flow information.

Next, at an operation 404, method 400 includes generating a model comprising a mapping from a plurality of traffic information features to at least one encrypted traffic analytics feature. Additionally, operation 404 of method 400 may be repeated for each domain of the one or more domains for which both encrypted traffic analytics information and traffic flow information is available from the observed telemetry data. As a result of operation 404, a set of models is generated. At an operation 406, a database is generated that comprises the set of models for each of the one or more domains generated at operation 404 above. For example, database 112 may be generated with set of models 114, 116, 118, as described above.

Once the database has been generated at operation 406, method 400 may proceed to use the database to generate encrypted traffic analytics features for target domains that have only traffic flow information/features available from the observed telemetry data. At an operation 408, method 400 includes obtaining telemetry data for a target domain that includes traffic flow information, but does not include encrypted traffic analytics information. For example, as described in reference to FIG. 2 above, target domain 200 has only traffic flow information 202 available.

At an operation 410, method 400 includes determining at least one encrypted traffic analytics feature of the target domain based on a plurality of traffic flow information features of the target domain using the database. For example, plurality of traffic flow information features 204 of target domain 200 may be used as an input to first model 114 of database 112. Based on the mapping between the traffic flow information features and encrypted traffic analytics features from first model 114, at least one encrypted traffic analytics feature 206 is generated for target domain 200.

Operation 410 may be repeated using additional traffic flow information features of a target domain to generate other encrypted traffic analytics features. For example, in cases where two or more different services are hosted by the target domain, the traffic flow information features associated with each service (e.g., which may be grouped by different service behaviors) may be used as separate inputs at operation 410. With this arrangement, at least one encrypted traffic analytics feature may be generated for each of the services hosted by the target domain and can be used to identify the services and/or to make assessments of whether the service is malware or benign (e.g., threat assessments 314 made by security monitoring system 310).

Figure 5:
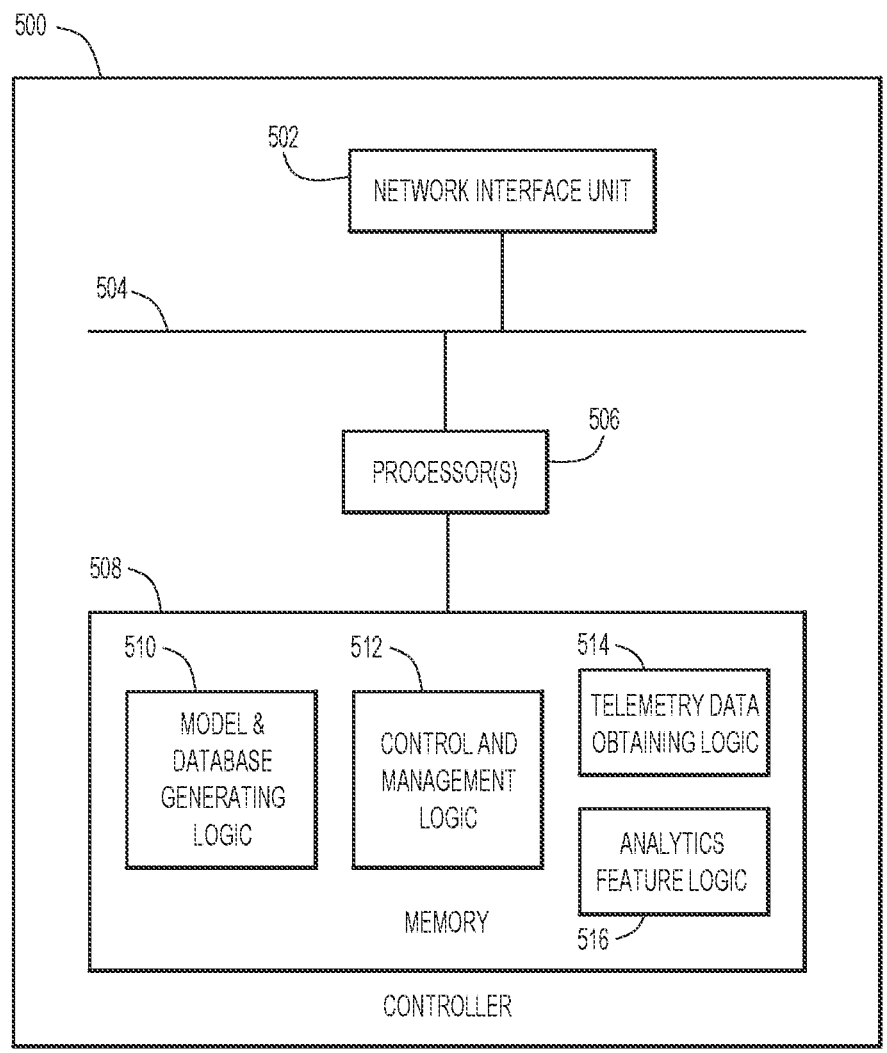
FIG. 5 is a block diagram of a network device in which techniques for determining encrypted traffic analytics features from traffic flow information features may be implemented, according to an example embodiment.

FIG. 5 is a block diagram of a network device in which techniques for determining encrypted traffic analytics features from traffic flow information features may be implemented, according to an example embodiment. In this embodiment, the network device for implementing the techniques according to the example embodiments described herein may be a network controller 500 that monitors and/or controls operations of network 100, including obtaining telemetry data 102 for a plurality of domains operating on network 100. In other embodiments, the functions may be performed by another network device with access to telemetry data 102 for network 100.

In this embodiment, controller 500 may perform the functions and operations described in reference to FIGS. 1-4 above. Controller 500 includes one or more processors 506, memory 508, a bus 504 and a network interface unit 502, such as one or more network interface cards that enable network connectivity. The memory 508 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 508 may comprise one or more tangible (non-transitory) computer readable storage media (e.g., a memory device) encoded with software comprising computer executable instructions and when the software is executed (by the processor 506) it is operable to perform the network controller operations described herein.

The memory 508 stores instructions for control and management logic 512, that when executed by the processor 506, cause the processor to perform the software defined network controller operations described herein. The memory 508 also stores instructions for operations associated with the techniques for determining encrypted traffic analytics features from traffic flow information features described herein. For example, memory 508 may further include a model and database generating logic 510, a telemetry data obtaining logic 514, and an encrypted traffic analytics feature logic 516.

In an example embodiment, model and database generating logic 510 may cause processor 506 to perform operations associated with generating the models for each of the one or more domains to map the plurality of traffic flow information features to at least one encrypted traffic analytics feature. Additionally, model and database generating logic 510 may also cause processor 506 to generate database 112 from the set of models (e.g., models 114, 116, 118) generated for each of the one or more domains.

Telemetry data obtaining logic 514 may cause processor 506 to perform operations associated with obtaining initial telemetry data for a plurality of domains which is used to generate the models for the database. For example, telemetry data obtaining logic 514 may cause processor 506 to obtain telemetry data 102 for network 100, including second portion 106 that includes both encrypted traffic analytics information and traffic flow information for one or more domains (e.g., first domain 108 and second domain 110). Telemetry data obtaining logic 514 may further cause processor 506 to obtain telemetry data for one or more target domains for which only traffic flow information and features are available. For example, traffic flow information 202 for target domain 200, which may be obtained in first portion 104 of telemetry data 102 for network 100.

In an example embodiment, encrypted traffic analytics feature logic 516 may cause processor 506 to perform operations associated with generating at least one encrypted traffic analytics feature of a target domain based on traffic flow information features using the database that maps traffic flow information features to encrypted traffic analytics features. For example, using database 112 to generate at least one encrypted traffic analytics feature for a target domain as described in reference to operation 410 of method 400 above.

The principles of the example embodiments provide a mechanism for extending or enriching knowledge of a target domain using machine learning models that are related or similar to the target domain. The input to the model is a set of traffic flow information features and the output is a set of the most probable encrypted traffic analytics features for the target domain.

Using the principles of the embodiments described herein, knowledge about a single domain may be extended/enriched. Additionally, all traffic observed for different domains and different users may also be enriched using the techniques described herein. The techniques of the example embodiments are helpful for contextual classifiers that operate not only on a single instance (e.g., a domain), but also on a set of instances/domains for which full information content is needed. For example, malicious user behavior typically consists of communication with particular services on different domains.

The example embodiments described herein extend extracted knowledge from network traffic having both traffic flow information and encrypted traffic analytics information to the rest of the network traffic for which only traffic flow information and not encrypted traffic analytics information is available. This extended/enriched knowledge provides additional evidence that may be needed for conviction, such as identifying malware. The described techniques are based on a combination of a lookup table/database and machine learning models, where the key in the table is a domain name and the value is a data-driven model.

The principles of the example embodiments allow the collection of all of the most probable communication patterns for each domain. Therefore, conviction for determination and/or identification can be made even on telemetry data from a network that is only partially covered by encrypted traffic analytics data or even a network with only traffic flow information data.

In one form, a method is provided comprising: obtaining telemetry data for one or more domains within a network, the telemetry data for the one or more domains including both encrypted traffic analytics information associated with network traffic in the network and traffic flow information associated with the network traffic; for each domain of the one or more domains, generating a model comprising a mapping from a plurality of traffic flow information features to at least one encrypted traffic analytics feature; generating a database comprising generated models for each of the one or more domains; obtaining telemetry data for a target domain that includes traffic flow information, but does not include encrypted traffic analytics information; and determining at least one encrypted traffic analytics feature of the target domain based on a plurality of traffic flow information features of the target domain using the database.

In another form, a non-transitory computer readable storage media encoded with instructions is provided that, when executed by a processor, cause the processor to perform operations comprising: obtaining telemetry data for one or more domains within a network, the telemetry data for the one or more domains including both encrypted traffic analytics information associated with network traffic in the network and traffic flow information associated with the network traffic; for each domain of the one or more domains, generating a model comprising a mapping from a plurality of traffic flow information features to at least one encrypted traffic analytics feature; generating a database comprising generated models for each of the one or more domains; obtaining telemetry data for a target domain that includes traffic flow information, but does not include encrypted traffic analytics information; and determining at least one encrypted traffic analytics feature of the target domain based on a plurality of traffic flow information features of the target domain using the database.

In yet another form, an apparatus is provided comprising: a communication interface configured to enable network communications with a plurality of devices in a network; and a processor coupled with the communication interface, and configured to: obtain telemetry data for one or more domains within the network, the telemetry data for the one or more domains including both encrypted traffic analytics information associated with network traffic in the network and traffic flow information associated with the network traffic; for each domain of the one or more domains, generate a model comprising a mapping from a plurality of traffic flow information features to at least one encrypted traffic analytics feature; generate a database comprising generated models for each of the one or more domains; obtain telemetry data for a target domain that includes traffic flow information, but does not include encrypted traffic analytics information; and determine at least one encrypted traffic analytics feature of the target domain based on a plurality of traffic flow information features of the target domain using the database.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining first telemetry data for a plurality of domains within a network, the first telemetry data for the plurality of domains including both encrypted traffic analytics information associated with network traffic in the network and traffic flow information associated with the network traffic;
   for each domain of the plurality of domains:
      generating a model by obtaining a plurality of traffic flow information features based on the traffic flow information of the first telemetry data associated with a specific domain of the plurality of domains, and at least one encrypted traffic analytics feature based on the encrypted traffic analytics information of the first telemetry data associated with the specific domain, the model comprising a mapping from the plurality of traffic flow information features to the at least one encrypted traffic analytics feature for the specific domain;
   generating a database by combining models generated for the plurality of domains;
   obtaining second telemetry data for a target domain that includes traffic flow information without encrypted traffic analytics information;
   selecting one model from the models in the database, for the target domain, based on similarities between the traffic flow information of the second telemetry data for the target domain and the plurality of traffic flow information features of the one model;
   determining at least one encrypted traffic analytics feature for the target domain based on a plurality of traffic flow information features of the target domain using the one model; and
   determining whether a service is benign or malware by identifying the service hosted on the target domain based on the at least one encrypted traffic analytics feature.

2. The method of claim 1, wherein the traffic flow information for the target domain is enriched with the at least one encrypted traffic analytics feature.

3. The method of claim 2, wherein the target domain hosts at least two different services; and
   wherein identity information associated with each service of the at least two different services is obtained using the traffic flow information that has been enriched with the at least one encrypted traffic analytics feature.

4. The method of claim 3, further comprising identifying one of the at least two different services as malware.

5. The method of claim 1, wherein the encrypted traffic analytics information includes one or more of sequence of packet lengths and times (SPLT), byte distribution, initial data packet (IDP) information, or transport layer security (TLS) data.

6. The method of claim 1, wherein the traffic flow information includes one or more of a port number, transferred bytes, transferred packets, Internet Protocol (IP) addresses, elapsed time, periodicity, flow rate, protocol, collector interface, or Transmission Control Protocol (TCP) flags.

7. The method of claim 1, wherein the target domain hosts at least two different services, and the method further comprising:

identifying type of each of the at least two different services based on the at least one encrypted traffic analytics feature.

8. A non-transitory computer readable storage media encoded with instructions that, when executed by a processor, cause the processor to perform operations comprising:
obtaining first telemetry data for a plurality of domains within a network, the first telemetry data for the plurality of domains including both encrypted traffic analytics information associated with network traffic in the network and traffic flow information associated with the network traffic;
for each domain of the plurality of domains:
generating a model by obtaining a plurality of traffic flow information features based on the traffic flow information of the first telemetry data associated with a specific of the plurality of domains, and at least one encrypted traffic analytics feature based on the encrypted traffic analytics information of the first telemetry data associated with the specific domain, the model comprising a mapping from the plurality of traffic flow information features to the at least one encrypted traffic analytics feature for the specific domain;
generating a database by combining models generated for the plurality of domains;
obtaining second telemetry data for a target domain that includes traffic flow information without encrypted traffic analytics information;
selecting one model from the models in the database, for the target domain, based on similarities between the traffic flow information of the second telemetry data for the target domain and the plurality of traffic flow information features of the one model;
determining at least one encrypted traffic analytics feature of for the target domain based on a plurality of traffic flow information features of the target domain using the one model; and
determining whether a service is benign or malware by identifying the service hosted on the target domain based on the at least one encrypted traffic analytics feature.

9. The non-transitory computer readable storage media of claim 8, wherein the traffic flow information for the target domain is enriched with the at least one encrypted traffic analytics feature.

10. The non-transitory computer readable storage media of claim 9, wherein the target domain hosts at least two different services; and
wherein identity information associated with each service of the at least two different services is obtained using the traffic flow information that has been enriched with the at least one encrypted traffic analytics feature.

11. The non-transitory computer readable storage media of claim 10, wherein the instructions further cause the processor to identify one of the at least two different services as malware.

12. The non-transitory computer readable storage media of claim 8, wherein the encrypted traffic analytics information includes one or more of sequence of packet lengths and times (SPELT), byte distribution, initial data packet (IDP) information, or transport layer security (TLS) data.

13. The non-transitory computer readable storage media of claim 8, wherein the traffic flow information includes one or more of a port number, transferred bytes, transferred packets, Internet Protocol (IP) addresses, elapsed time, periodicity, flow rate, protocol, collector interface, or Transmission Control Protocol (TCP) flags.

14. The non-transitory computer readable storage media of claim 8, wherein the target domain hosts at least two different services, and wherein the instructions further cause the processor to perform operations comprising:
identifying type of each of the at least two different services based on the at least one encrypted traffic analytics feature.

15. An apparatus comprising:
a communication interface configured to enable network communications with a plurality of devices in a network; and
a processor coupled with the communication interface, and configured to:
obtain first telemetry data for a plurality of domains within the network, the first telemetry data for the plurality of domains including both encrypted traffic analytics information associated with network traffic in the network and traffic flow information associated with the network traffic;
for each domain of the plurality of domains;
generate a model by obtaining a plurality of traffic flow information features based on the traffic flow information of the first telemetry data associated with a specific domain of the plurality of domains, and at least one encrypted traffic analytics feature based on the encrypted traffic analytics information of the first telemetry data associated with the specific domain, the model comprising a mapping from the plurality of traffic flow information features to the at least one encrypted traffic analytics feature for the specific domain;
generate a database by combining models generated for each of the plurality of domains;
obtain second telemetry data for a target domain that includes traffic flow information without encrypted traffic analytics information;
select one model from the models in the database, for the target domain, based on similarities between the traffic flow information of the second telemetry data for the target domain and the plurality of traffic flow information features of the one model;
determine at least one encrypted traffic analytics feature of the target domain based on a plurality of traffic flow information features of the target domain using the one model; and
determine whether a service is benign or malware by identifying the service hosted on the target domain based on the at least one encrypted traffic analytics feature.

16. The apparatus of claim 15, wherein the target domain hosts at least two different services; and
wherein identity information associated with each service of the at least two different services is obtained using the traffic flow information that is enriched with the at least one encrypted traffic analytics feature.

17. The apparatus of claim 16, wherein the processor is further configured to identify one of the at least two different services as malware.

18. The apparatus of claim 15, wherein the encrypted traffic analytics information includes one or more of sequence of packet lengths and times (SPLT), byte distribution, initial data packet (IDP) information, or transport layer security (TLS) data; and
wherein the traffic flow information includes one or more of a port number, transferred bytes, transferred packets, Internet Protocol (IP) addresses, elapsed time, periodicity, flow rate, protocol, collector interface, or Transmission Control Protocol (TCP) flags.

19. The apparatus of claim 15, wherein the target domain hosts at least two different services, and the processor is further configured to:
   identify type of each of the at least two different services based on the at least one encrypted traffic analytics feature.

20. The apparatus of claim 15, wherein the traffic flow information for the target domain is enriched with the at least one encrypted traffic analytics feature, and wherein the encrypted traffic analytics information includes one or more of: sequence of packet lengths and times (SPLT), byte distribution, initial data packet (IDP) information, or transport layer security (TLS) data.

* * * * *

UNITED STATES PATENT AND TRADEMARK OFFICE
CERTIFICATE OF CORRECTION

PATENT NO. : 11,233,703 B2
APPLICATION NO. : 16/196543
DATED : January 25, 2022
INVENTOR(S) : Martin Vejman et al.

Page 1 of 1

It is certified that error appears in the above-identified patent and that said Letters Patent is hereby corrected as shown below:

In the Claims

Claim 12, Column 11, Line 62, please replace "times (SPELT), byte" with -- times (SPLT), byte --

Claim 15, Column 12, Line 34-35, please replace "for each of the plurality" with -- for the plurality --

Signed and Sealed this
Thirty-first Day of May, 2022

Katherine Kelly Vidal
*Director of the United States Patent and Trademark Office*